(12) United States Patent
Julliard et al.

(10) Patent No.: US 7,661,261 B2
(45) Date of Patent: Feb. 16, 2010

(54) ACOUSTIC FLOW STRAIGHTENER FOR TURBOJET ENGINE FAN CASING

(75) Inventors: Jacques Michel Albert Julliard, Hericy (FR); Olivier Michael Molinari, Avon (FR); Patrick Charles Georges Morel, Chartrettes (FR); Georges Jean Xavier Riou, Melun (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/019,346

(22) Filed: Jan. 24, 2008

(65) Prior Publication Data
US 2008/0236137 A1    Oct. 2, 2008

(30) Foreign Application Priority Data
Jan. 25, 2007   (FR)   ................... 07 00524

(51) Int. Cl.
  *F02K 3/02*   (2006.01)
(52) U.S. Cl. ..................... 60/226.1; 415/115
(58) Field of Classification Search ........... 60/226.1; 415/115, 119, 114; 416/227 R, 229 R, 231 B, 416/231 R, 232, 233, 241 R
See application file for complete search history.

(56) References Cited

U.S. PATENT DOCUMENTS

| 3,735,593 | A | * | 5/1973 | Howell ................. 60/226.1 |
| 4,240,250 | A | | 12/1980 | Harris |
| 5,356,264 | A | | 10/1994 | Watson et al. |
| 5,782,077 | A | * | 7/1998 | Porte ................... 60/782 |
| 2004/0062649 | A1 | * | 4/2004 | Schopf ................ 416/97 R |
| 2006/0104819 | A1 | * | 5/2006 | Jones et al. ............ 416/233 |
| 2006/0169532 | A1 | | 8/2006 | Patrick | |

FOREIGN PATENT DOCUMENTS

| EP | 1 548 229 A2 | 6/2005 |
| EP | 1 714 871 A2 | 10/2006 |
| GB | 2 254 892 A | 10/1992 |
| GB | 2 361 035 A | 10/2001 |
| WO | WO 2005/057001 A2 | 6/2005 |

\* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

The present invention relates to a structural or non-structural turbojet engine fan casing connecting arm that also acts as a flow straightener downstream of the fan rotor. Its distinctive feature is that it is constructed to form an acoustic attenuator. In particular, it comprises a closed cavity and perforations on one of the faces so as to form a Helmholtz resonator. The arm forms part of the intermediate casing.

11 Claims, 1 Drawing Sheet

ACOUSTIC FLOW STRAIGHTENER FOR TURBOJET ENGINE FAN CASING

BACKGROUND OF THE INVENTION AND DESCRIPTION OF THE PRIOR ART

The present invention relates to the field of bypass turbojet engines and is aimed at attenuating the noise emitted by the engine, particularly the noise emitted by the fan.

A bypass turbojet engine for transport airplane propulsion comprises a fan, generally on the upstream side, delivering an annular airflow with a primary central annular part which supplies air to the engine that drives the fan and a secondary external annular part which is ejected to the atmosphere thereby providing a significant proportion of the thrust. The fan is contained inside a casing which delimits the secondary or bypass flow. A structural element of the engine known as the intermediate casing comprises a hub supporting the shafts that connect the various rotors, an outer annular casing and radial connecting arms connecting these casings together. The radial arms transmit some of the forces between the engine and its support. At the present time a ring of guide vanes is usually fitted, in the engines, between the fan rotor and the arms of the intermediate casing, in order to straighten the secondary flow along the axis of the engine. These vanes are generally known by their abbreviation OGV which stands for Outlet Guide Vanes.

Recently, engines have been developed in which the connecting arms act as flow straighteners straightening the flow downstream of the fan. This flow straightening function means that there needs to be a high number of arms and of OGVs, of the order of 30 to 50 of them in a bypass engine with 18 to 24 blades on the fan rotor, and therefore of a relatively small maximum thickness. In this example, the maximum thickness of the OGVs is 10 to 15 mm. In the case of certain arms it may exceed 100 mm. This arrangement, which also allows the flow straightener vanes to be kept away from the rotor blades thus improving fan efficiency by the order of 0.3 to 0.4 of a point in the case of engines with a high bypass ratio, has a favorable effect on the magnitude of the mechanisms of interaction between flow and cascade of guide vanes. It is at this cascade that noise is generated as a result of the impact of fluctuations in speed and in pressure on the vanes and which are caused by the unsteady flow. It should also be emphasized that the choice of the number of flow straightening vanes is already guided by acoustic criteria applied at the design stage with a view to reducing the noise at source. This criterion results in there being at least twice as many stator vanes as there are rotor blades in order to be able to cut out the acoustic modes generated by the interaction of the wake from the rotor on the stator at the rotor blade sweep frequency. This recommendation is applied fairly systematically to the design of any fan.

SUMMARY OF THE INVENTION

The applicant company has set itself the objective of improving the reduction in the noise emitted by the fan in the context of this last configuration. The applicant company has, in particular, set itself the objective of developing a device capable of reducing fan noise while at the same time maintaining the aerodynamic performance and the mechanical integrity without increasing the mass.

This is achieved according to the invention using a structural or non-structural turbojet engine fan casing connecting arm that also acts as a flow straightener downstream of the fan rotor, its distinctive feature being that it is constructed in such a way as to form an acoustic attenuator. More particularly, the arm comprises a cavity which is closed off at both ends and perforations on one of the faces so as to form a Helmholtz resonator.

By virtue of the invention, by acoustically treating at least some of the structural or nonstructural arms such as those that form part of the intermediate casing, it becomes possible to meet an objective of significant noise reduction.

Specifically, the solution of the invention allows a reduction in engine noise at the medium frequencies ranging from 2000 to 3000 Hz that has estimated significant acoustic performance between 0.5 EPNdB and 1 EPNdB within tolerance combined across the three measurement points used for acoustic certification. By being arranged radially in the flow channel this solution is able in particular to "trap" some of the acoustic energy which cannot be dissipated by parietal acoustic treatments.

The solution of the invention also has the advantage that it has a negligible impact on the aerodynamic performance of the fan provided that certain precautions are taken when implementing it. Thus, in order to limit friction losses, the perforations will be located on the intrados of the arms, which is where the flow velocities are lower, while at the same time minimizing the orifice diameters thereof such that d<1 mm. It is also very important to prevent any recirculation of air inside the arms which means that the perforated regions need to be positioned to take account of the static pressure profiles over the height of the arms.

The solution of the invention has the further advantage of carrying a very low weight penalty. The mass is similar to that of a casing with untreated hollow arms.

The solution of the invention has the further advantage of maintaining the conventional mechanical architecture of the component. This differs only slightly from a hollowed-out but not acoustically treated production arm. This feature also means that the manufacturing and industrialization costs are such that mass production can be envisioned.

By adding an acoustic function to the functions, one of them being a connecting and possibly structural function, and the other being an aerodynamic function, already performed by an inbuilt flow straightener with which modern-day fan casings are equipped, it is necessary to reach a compromise between the acoustic efficiency, given the small volume available inside the arms, the mass, and the ease of manufacture.

According to another feature, the perforations are formed on the intrados face of the connecting arm and more specifically, the perforations are formed on the upper part of the arm where the noise intensity is the greatest.

Advantageously, the perforations have a diameter smaller than 1 mm, and in particular, the perforations have a diameter smaller than 0.5 mm.

According to another feature, the degree of perforation in the perforated regions represents between 5 and 10%.

When the arm comprises at least one internal reinforcing element such as, for example, a stiffener in the form of a section piece, the latter is extensively holed.

The arrangement of the invention also makes it possible, as appropriate, to fine-tune the volume of the cavity using a simple pocket or some other hollow element which extends it outside of the secondary flow channel beyond the fan casing. Advantageously, this pocket is housed inside the nacelle surrounding the fan casing. It could possibly be housed inside the cowling of the body of the primary stream but a solution such as this would prove difficult to implement.

BRIEF DESCRIPTION OF THE DRAWINGS

One nonlimiting embodiment of the invention is now described with reference to the drawings in which.

DESCRIPTION OF THE PREFERRED EMBODIMENT

Figure 1:
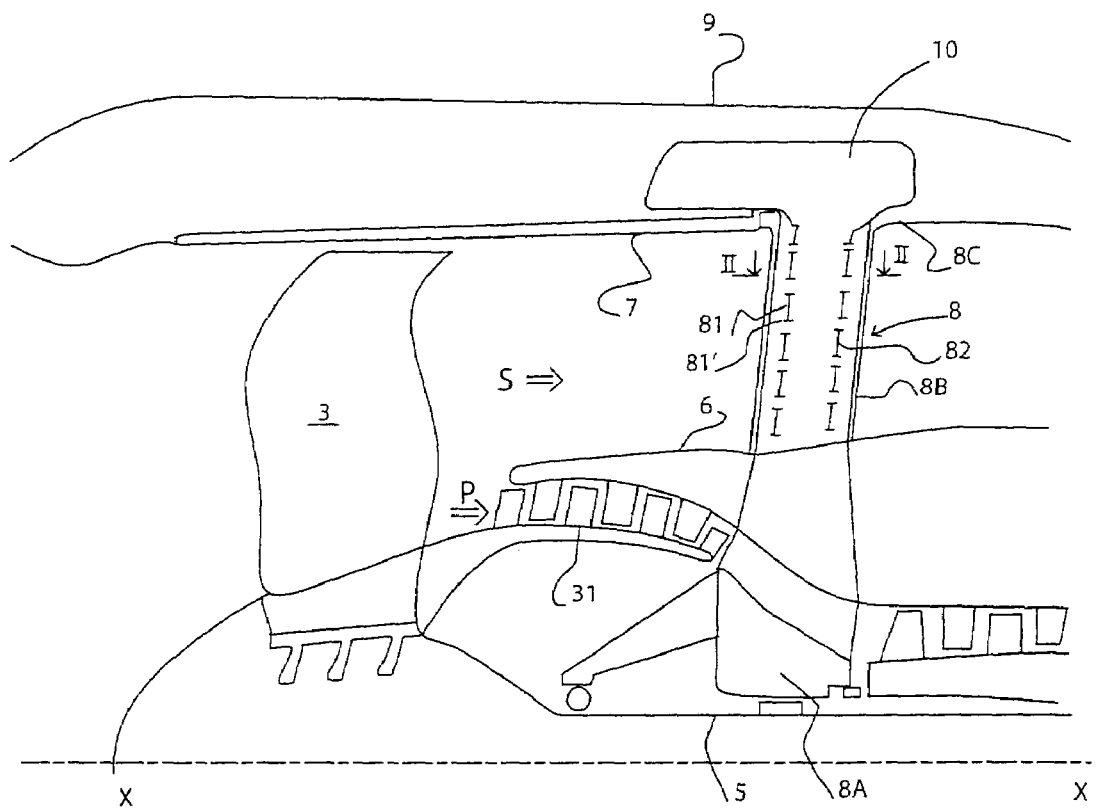
FIG. 1 shows, in axial half section, a partial view of the upstream part of a turbofan engine with the fan mounted at the front.

A bypass turbofan engine 1 with the fan located at the front comprises a fan rotor 3 mounted at the front end of a shaft 5 which is connected at the downstream end to a turbine, not depicted in the figure. The fan sucks in air and compresses it into an annular double stream, namely a primary flow P closest to the axis XX of the engine and a secondary flow S concentric therewith. The primary flow P passes through successive compression stages only the first 31 and 32 of which can be seen in FIG. 1. The primary flow P is thus compressed and guided as far as the combustion chamber. The gases resulting from combustion are directed toward the turbine rotors where the energy is recovered. The low-pressure turbine is connected to the rotor of the fan 3 by the LP shaft 5 the upstream end of which can be seen in the figure. The secondary flow S is guided downstream between the fairing 6 of the body of the primary flow and the external fan casing 7 and passes through the impeller formed by the intermediate casing 8. This intermediate casing 8 comprises a hub 8A through which the LP shaft 5 of the engine passes and which supports the front bearings of the HP and LP shafts. An outer shroud 8C supports the shroud of the fan casing 7. Radial arms 8B known as connecting arms connect the hub 8A to the exterior shroud 8C. This assembly forms the intermediate casing 8 and plays a structural role in so far as the forces are transmitted via it; in particular, the means of attaching the engine to the structure of the airplane in the front part are secured to the intermediate casing 8.

This may consist either of a single one-piece part or of a welded or bolted assembly of primary parts. The radial arms 8B in the configuration of the invention have, in the case of some them, a structural function and an aerodynamic flow-straightening function and, in the case of others, merely an aerodynamic function. The arms have an aerodynamic profile and are sufficient in number to straighten the secondary air flow from the fan rotor 3 along the axis of the engine.

Depending on how it is arranged on the airplane, the secondary flow S is either ejected directly into the atmosphere downstream of the intermediate casing in the form of a flow separate from the primary flow or is mixed downstream with the gases of the primary flow to form a mixed flow.

The present invention applies with equal preference to both possible alternative forms of arrangement, separate primary and secondary flows or the two flows mixed together. By comparison with the engines of the early generation, the radial arms perform the two functions reported above. This arrangement is known per se. It is also known that the arrangement of the radial arms combined with the flow-straightening function has a favorable effect on fan noise generation by putting the flow straightening at a distance.

It is also known from other sources to treat the walls of the annular fan duct acoustically by using noise attenuating elements. According to one known method, acoustic attenuation is achieved using Helmholtz resonators with n degrees of freedom (n=1 or 2 in general).

It will be recalled that Helmholtz resonators are made up of a solid non-porous layer, of one or more partitions perpendicular to this layer, often produced in the form of a honeycomb structure, and of one or more porous layers; the entity thus constitutes one or more cavities. The solid layer makes it possible to impose a zero acoustic velocity condition at the wall. The partitions guide the sound wave which is propagated in the form of a plane wave given the high ratio of the wavelength to the transverse dimension of the cavity.

Panel-based Helmholtz resonators are commonly used in turbojet engine pipes because of their excellent mechanical and acoustic properties.

According to the invention, at least some of the radial arms 8B are acoustically treated. It should be noted that the radial arms through which the auxiliaries pass are preferably not subjected to the acoustic treatment because of the lack of free space available therein.

The other arms are generally hollow. According to the invention, the air volume available inside these arms is put to use to form Helmholtz resonators. FIG. 2 depicts a section at right angles to the radial axis of a radial connecting arm 8B thus treated. This arm has an aerodynamic shape with an intrados face 8Bin and an extrados face 8Bex which faces extend between a leading edge 8Bat and a trailing edge 8Bfu. Stiffeners 81 and 82 in the form of profile sections are, in this example, positioned between the two faces 8Bin and 8Bex to consolidate the structure of the arms 8B. However, the arms may have none of these. These stiffeners are holed with holes 81 and 82'. One or both faces 8Bin and/or 8Bex are provided with perforations 83. The stiffeners can also be seen in FIG. 1 which shows an arm in axial section.

The closed volume formed between the two faces, combined with the perforations, forms a Helmholtz resonator. The tuning frequency or frequencies of the resonators thus formed are adjusted in such a way as to dissipate acoustic energy through viscothermal mechanisms through the perforations.

The perforations 83 are formed locally preferably on the upper part of the intrados so as to avoid aerodynamic friction losses and recirculation of the air inside the arms.

However, according to one particular embodiment, perforations are formed on the extrados on some of the resonators with a view to attenuating the pressure fluctuations associated with the wake and which are particularly high in the region near the leading edge. It is known that this phenomenon causes a substantial proportion of the fan noise. In this case, the configuration adopted is a compromise between the acoustic advantages and the aerodynamic losses engendered.

The perforations 83 have a maximum diameter of 1 mm and a diameter preferably smaller than 0.5 m and are advantageously circular. At diameters above 1 mm, the aerodynamic losses begin to become significant. Placed in communication with the air cavity formed inside the arm, they constitute a Helmholtz resonator in which acoustic dissipation is performed through viscothermal losses generated at these perforations.

In this dissipative system the constraint on which is that the cavity volume is fixed, frequency tuning is performed chiefly by altering the size of the perforated region or regions which act as the "neck" of the resonator.

In order to absorb noise in the target frequency range from 2000 to 3000 Hz, on the one hand, approximately half of the surface of the intrados is perforated and, on the other hand, the internal stiffeners are holed in order to set the entire volume of air contained in an arm into resonance. In terms of porosity, the degree of perforation in the perforated region or regions is preferably set at a value ranging between 5 and 10%.

For a solution in which perforations 83 are distributed over the extrados and the intrados, the perforated region represents approximately one quarter of the wetted surface of the vane. The perforations preferably lie in the upper half, at the same end as the shroud 8C.

By virtue of the invention, improvements are made to the acoustic levels without any penalty to engine performance at a reasonable cost of implementation both in terms of industrialization and in terms of manufacture, the overall mass being practically unaffected.

In terms of the materials and methods that can be used to obtain these flow-straightening radial arms, there are a certain number of possible industrial solutions such as those already applied to similar parts. These are either solutions involving welded, brazed or bolted assemblies of primary mechanical parts or solutions involving obtaining a one-piece part as a casting or as a forging with an insert. Another solution involves composite materials with an organic matrix or metallic matrix.

Solutions involving obtaining an organic matrix are performed using carbon fiber and/or glass fiber with epoxy resin. The part is obtained either from a stack of 2D prepregs or from a stack of RTM injected 2D fabrics, or from RTM injected woven or braided preforms.

Figure 2:
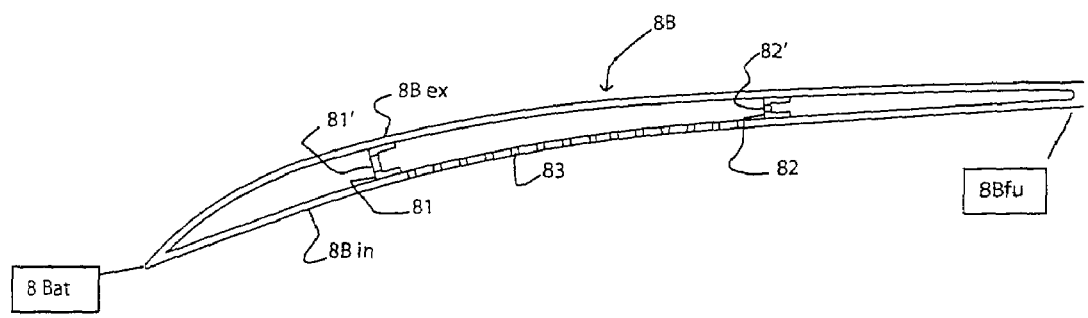
FIG. 2 shows a connecting arm belonging to the intermediate casing of the turbojet engine of FIG. 1, viewed in section on II-II perpendicular to its radial axis.

According to another particular embodiment, the volume of the resonator cavity is altered by fitting an additional cavity as depicted in FIG. 1 in the form of a pocket 10 that can be seen in cross section. This additional cavity constitutes an extension of the cavity defined between the walls 8Bin and 8Bex. The pocket 10 is positioned in the engine nacelle beyond the fan casing. This pocket is open onto the cavity of the radial arm 8. In this way it is also possible, by selecting an appropriate volume for the pocket, easily to tune the Helmholtz resonator to the frequencies needed for providing the desired attenuation.

The invention claimed is:

1. A turbojet engine fan casing connecting arm that acts as a flow straightener downstream of a fan rotor, said arm extending between a nacelle that surrounds a fan casing and an internal casing for a primary flow of the turbojet engine, said arm being constructed to form an acoustic attenuator and comprising:

an extrados face and an intrados face defining a cavity wherein at least one of the extrados or intrados faces defines perforations through one of the extrados or intrados faces so as to form a Helmholtz resonator inside said cavity, wherein the cavity is extended by a closed pocket housed in the nacelle that surrounds the fan casing, wherein said closed pocket element do not have any openings except for a channel communicating with said cavity.

2. The connecting arm as claimed in claim 1 in which the perforations are formed on the intrados face of the arm.

3. The connecting arm as claimed in claim 1, wherein the perforations are formed on an upper part of the arm.

4. The connecting arm as claimed in claim 1, wherein the perforations have a diameter smaller than 1 mm.

5. The connecting arm as claimed in claim 4, wherein the perforations have a diameter smaller than 0.5 mm.

6. The connecting arm as claimed in claim 1, wherein a degree of perforation in perforated regions represents between 5 and 10% of a total area of the arm.

7. The connecting arm as claimed in claim 1, comprising at least one internal reinforcing element defining a hole.

8. A bypass turbojet engine intermediate casing comprising, at least in part, radial arms as claimed in claim 1.

9. A turbojet engine comprising a fan and structural connecting arms as claimed in claim 1.

10. The turbojet engine as claimed in claim 9, wherein the arms form part of an intermediate casing.

11. The connecting arm as claimed in claim 1, wherein said closed pocket in said nacelle is free of any opening communicating with a secondary air flow.

\* \* \* \* \*